United States Patent [19]

Liang

[11] Patent Number: 5,003,700
[45] Date of Patent: Apr. 2, 1991

[54] INSTRUMENT FOR INDICATING AN ANGULAR POSITION OF AN OBJECT

[76] Inventor: Jeng An Liang, 153, Lane 181, Ta-Shing St., Taichung, Taiwan

[21] Appl. No.: 511,215

[22] Filed: Apr. 19, 1990

[51] Int. Cl.⁵ .............................................. G01C 9/04
[52] U.S. Cl. ...................................................... 33/401
[58] Field of Search .................. 33/391, 396, 398, 401

[56] References Cited

U.S. PATENT DOCUMENTS

| | | | |
|---|---|---|---|
| 1,460,741 | 7/1923 | Young | 33/401 |
| 2,326,518 | 8/1943 | Beatty | 33/391 |
| 3,241,245 | 3/1966 | Levine | 33/401 X |

FOREIGN PATENT DOCUMENTS 616943 2/1961 Italy ...................................... 33/401

Primary Examiner—Harry N. Haroian
Attorney, Agent, or Firm—Fleit, Jacobson, Cohn, Price, Holman & Stern

[57] ABSTRACT

An instrument has a disc pivoted to a face board which has a graduation provided on a radially outward position. A weight is provided at a lower end of the disc so that a mass center of the disc is not coincide with the rotational axle. A pointer is fixed to a front end of the rotational axle. The disc is rotated by gravity when the instrument is placed against a surface of the object so that a relative position between the pointer and the graduation indicates an accurate angular position of the object.

4 Claims, 3 Drawing Sheets

INSTRUMENT FOR INDICATING AN ANGULAR POSITION OF AN OBJECT

BACKGROUND OF THE INVENTION

The present invention relates to an instrument, and more particularly to an instrument for indicating an angular position of an object.

Bubble levels are generally known in form of transparent closed tubes partly filled with liquid so that a gas bubble is left in the tube. The reading of the bubble levels is not accurate.

U.S. Pat. No. 3,945,129 to Bergkvist discloses an instrument to indicate a more accurate angular position of an object. The line patterns of the instrument form a moire pattern to indicate the angular position of the object. The instrument can not tell an exact angular position of the object.

The present invention has arisen to mitigate and/or obviate the afore-described disadvantages of the conventional instrument for indicating an angular position of an object.

SUMMARY OF THE INVENTION

The primary objective of the present invention is to provide an instrument for indicating an angular position of an object, in which the instrument indicates an accurate angular position of the object.

According to one aspect of the present invention, there is provided an instrument for indicating an angular position of an object. A disc is pivoted to a face board which has a graduation provided on a radially outward position. The disc has a weight provided at a lower end so that a mass center of the disc is not coincide with the rotational axle. A pointer is fixed to a front end of the rotational axle. The disc is rotated by gravity when the instrument is placed against a surface of the object so that a relative position between the pointer and the graduation indicates an accurate angular position of the object.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
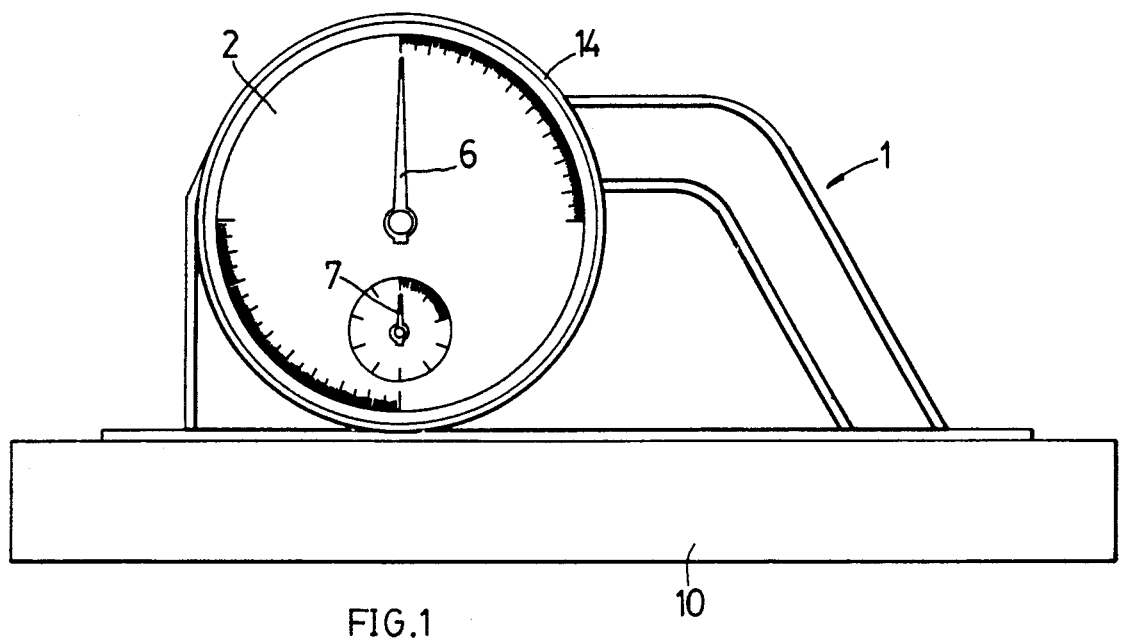
FIG. 1 is a front elevational view of an instrument for indicating an angular position in accordance with the present invention.
Figure 2:
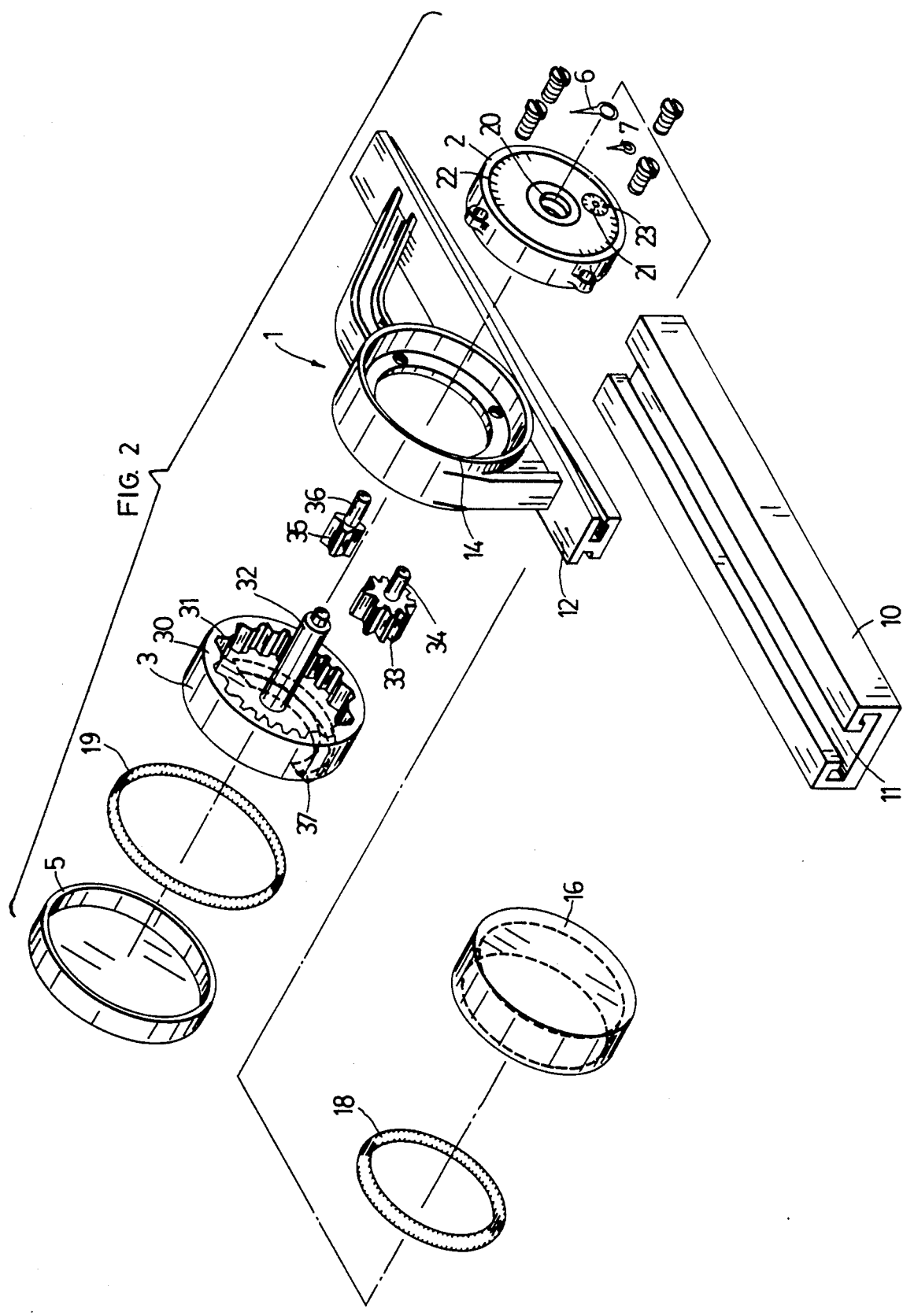
FIG. 2 is an exploded view of the instrument.

Referring to the drawings and initially to FIGS. 1 and 2, the instrument for indicating an angular position of an object in accordance with the present invention comprises generally a frame body 1 having a base portion 12 and an annular frame 14. A seat 10 which has a substantially rectangular cross section has a longitudinal channel 11 formed on an upper surface thereof. The base portion 12 of the frame body 1 is received in the channel 11 of the seat 10. The lower surface of the seat 10 is flat and level.

Figure 4:
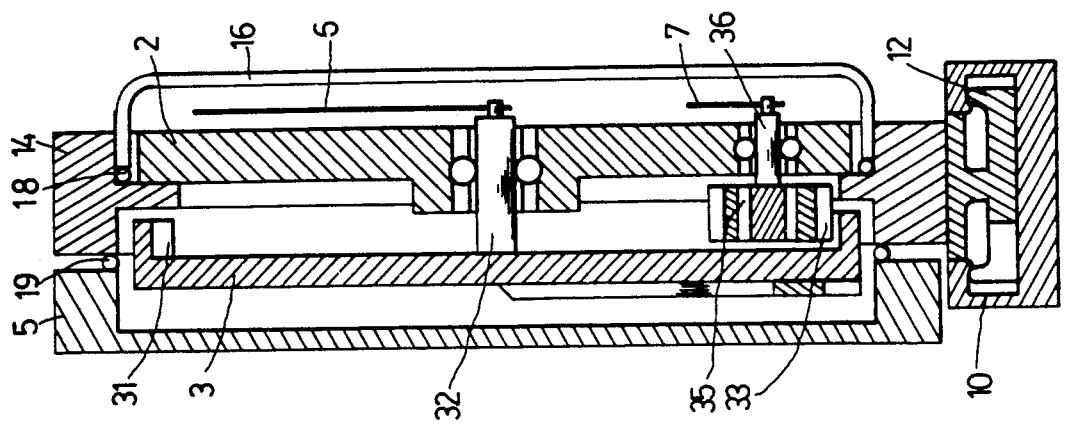
FIG. 4 is a cross sectional view of the instrument taken along lines 4—4 of FIG. 1.
Figure 3:
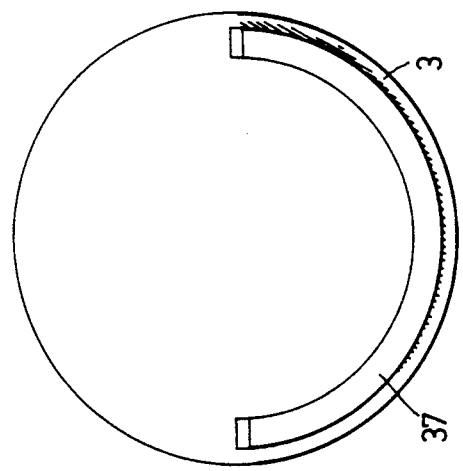
FIG. 3 is a rear elevational view of a disc of the instrument.

Referring to FIGS. 2, 3 and 4, the face board 2 which is substantially circular is fixed in a front end of the annular frame 14. The face board 2 has a center hole 20. A hole 21 is formed in the face board 2 and has a distance substantially below the center hole 20. An angular graduation 22 of is provided on a radially outward position of the face board 2. As shown in FIG. 1, the upper and right sector of the face board 2 is graduated with 90 degrees. The face board 2 is preferably graduated with 360 degrees. A circular graduation 23 which is provided around the hole 21 is divided into ten sectors, each sector is divided to ten sub-sectors, each sub-sector represents one tenth of one degree.

The disc 3 has a ring portion 30 formed on the front surface thereof. An inner gear rack 31 is formed in the inner surface of the ring portion 30. A pivot axle 32 is fixed on the center of the disc 3 and extends forward. The pivot axle 32 is rotatably supported in the center hole 20 of the face board 2 by a ball bearing (FIG. 4) or the like. A long pointer 6 is fixed at the front end of the pivot axle 32 and rotated therewith. A first pinion 33 which is pivoted to the face board 2 by a pivot axle 34 is engaged with the gear rack 31 and is driven to rotate by the gear rack 31. A second pinion 35 which is pivoted to the face board 2 by a pivot axle 36 is engaged with the first pinion 33 and is driven to rotate by the first pinion 33. The pivot axles 34, 36 are rotatably supported on the face board 2 by ball bearings or the like, in which the pivot axle 36 is rotatably received in the hole 21. A short pointer 7 is fixed to the front end of the pivot axle 36 and rotated therewith. A weight 37 which is substantially semi-annular is fixed to a rear surface of the disc 3 (FIG. 3). The weight 37 is symmetric to a vertical axis V of the disc 3 and has a high density such that the mass center of the disc 3 will not be coincide with the rotational axle 32. Therefore, the disc 3 will be rotated by gravity to an angular position when the device is used. A rear cap 5 is fixed to the rear end of the annular frame 14. A face cap 16 (FIG. 4) which is substantially transparent is fixed to the annular frame 14 in front of the face board 2. As shown in FIG. 4, it is preferable that the interior of the instrument is filled with oil or the like so as to provide a damping effect for the rotation of the disc 3. Sealing rings 18, 19 (FIG. 4) provide a water seal for the instrument.

When the lower surface of the seat 10 is placed against a surface of an object, the disc 3 will be rotated by gravity, in such a manner that the pointer 6 which is fixed to the pivot axle 32 of the disc 3 indicates an accurate readings of the angular position of the object. The pinions 33, 35 are provided to magnify the rotational angle of the disc 3, in such a manner that the pinion 35 rotates one round when the disc 31 rotates ten degrees. Therefore, the pointer 7 indicates a reading to one tenth of one degree. The accuracy of the indication is up to 0.05 degree.

Figure 6:
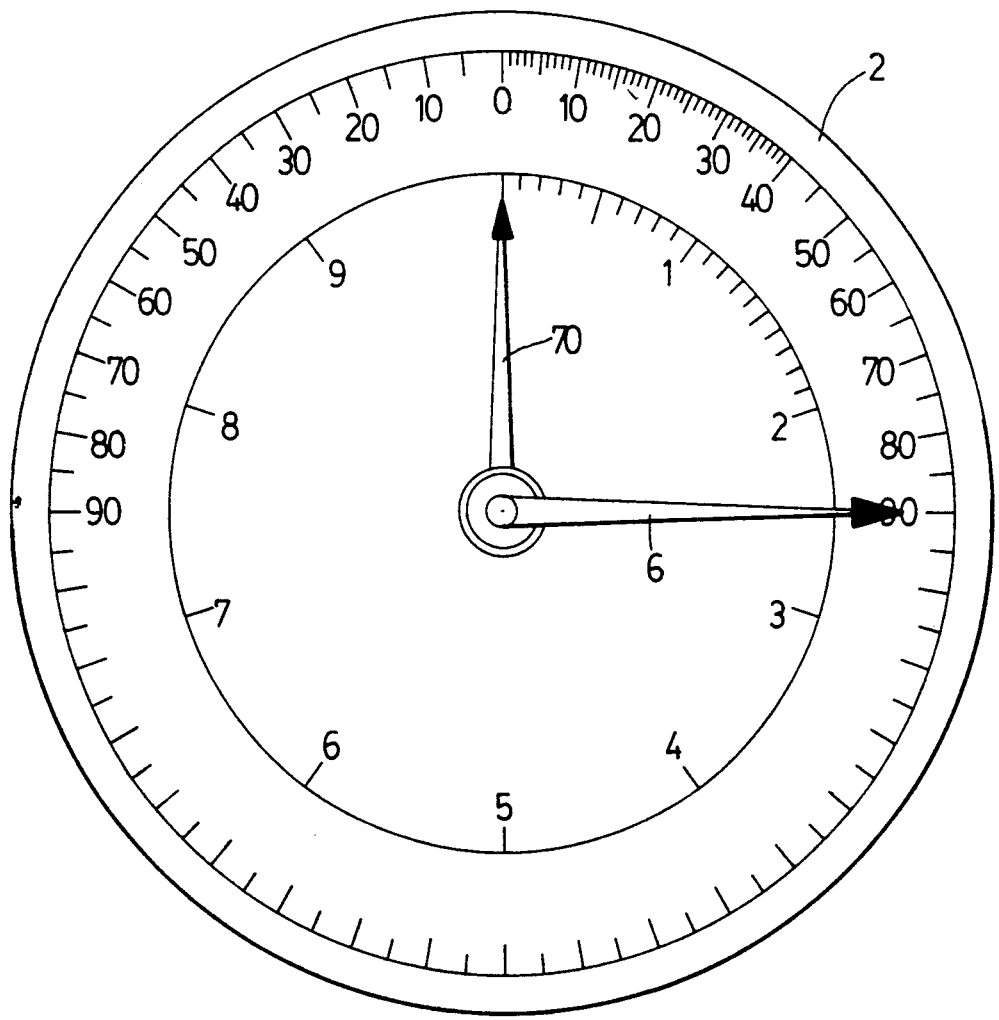
FIG. 6 is a front elevational view of a face board.
Figure 5:
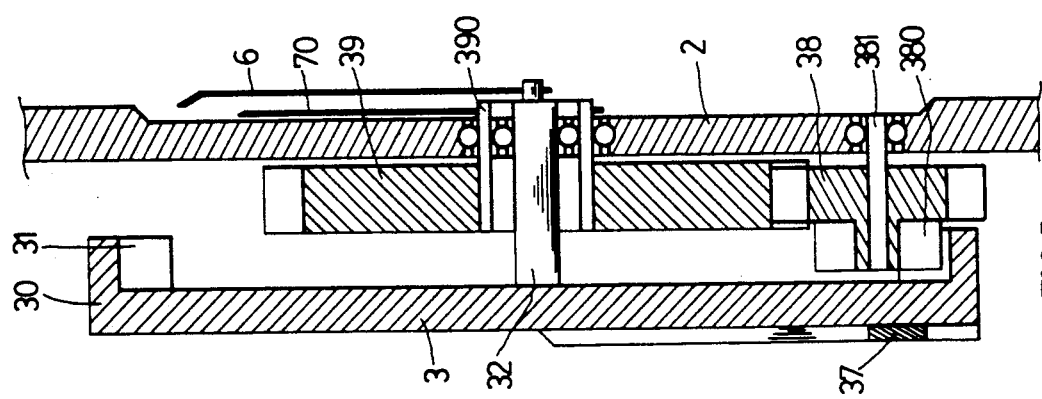
FIG. 5 is a partial cross sectional view of another embodiment of the instrument.

Referring next to FIGS. 5 and 6, illustrated is another embodiment of the instrument in accordance with the present invention. In this embodiment, the disc 3 is similar to that of the previous embodiment and also has a ring portion 30, an inner gear rack 31, a pivot axle 32 and a weight 37. Two pinions 38, 380 which are coaxially fixed together are pivotally supported on the face board 2 by a pivot axle 381. The pinion 380 is engaged with the gear rack 31. A gear 39 which is engaged with the pinion 38 is pivotally supported on the face board 2 by a pivot axle 390. The pivot axles 32, 390 are biaxial and are rotatable about an identical rotational axis. A short pointer 70 is fixed to a front end of the pivot axle 390. Two graduations of different scales are provided around the center of the face board 2. The pinions 38, 380 and the gear 39 are provided to magnify the rotational angle of the pivot axle 32. It is preferable that the pivot axle 390 (short pointer 70) rotates one round when the pivot axle 32 (pointer 6) rotates ten degrees. A relative position between the pointers and the respective graduations indicates an accurate angular reading for the object.

Accordingly, the instrument in accordance with the present invention indicates an accurate angular position of the object, and an accurate reading of the angular position can be obtained.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An instrument for indicating an angular position of an object comprising a frame body having a base portion and an annular frame fixed together; a face board which has a center hole being fixed to a front end of said annular frame, a first graduation being provided on a radially outward position of said face board; a disc having a first axle fixed to a center thereof, said first axle being rotatably supported in said center hole of said face board; a weight being provided to a lower end of said disc and being substantially symmetric about a vertical axis of said disc so that a mass center of said disc does not coincide with said first axle; and a first pointer being fixed to a front end of said first axle; and said disc being rotated by gravity when said base portion of said frame body is placed against a surface of said object so that a relative position between said first pointer and said first graduation indicates an accurate angular position of said object; a ring portion being formed on a front end of said disc, an inner gear rack being formed on an inner surface of said ring portion; a first pinion being pivoted to said face board and being engaged with said inner gear rack of said disc; a second pinion being pivoted to said face board by a second axle and being engaged with said first pinion; a second pointer being fixed to a front end of said second axle; a second graduation being provided on said face board around said second axle; and a relative position between said second pointer and said second graduation indicating an enlarged rotational angle of said first axle.

2. An instrument according to claim 1, wherein said second axle rotates one round when said first axle rotates ten degrees.

3. An instrument for indicating an angular position of an object comprising a frame body having a base portion and an annular frame fixed together; a face board which has a center hole being fixed to a front end of said annular frame, a first graduation being provided on a radially outward position of said face board; a disc having a first axle fixed to a center thereof, said first axle being rotatably supported in said center hole of said face board; a weight being provided to a lower end of said disc and being substantially symmetric about a vertical axis of said disc so that a mass center of said disc does not coincide with said first axle; and a first pointer being fixed to a front end of said first axle; and said disc being rotated by gravity when said base portion of said frame body is placed against a surface of said object so that a relative position between said first pointer and said first graduation indicates an accurate angular position of said object; a ring portion being formed on a front end of said disc, an inner gear rack being formed on an inner surface of said ring portion; a first pinion and a second pinion which are coaxially fixed together being pivoted to said face board, said first pinion being engaged with said inner gear rack; a gear being biaxially supported on said first axle by a second axle and being engaged with said second pinion; a second pointer being fixed to a front end of said second axle; a second graduation being provided on said face board around said first axle and said second axle; and a relative position between said second pointer and said second graduation indicating on enlarged rotational angle of said first axle.

4. An instrument according to claim 3, wherein said second axle rotates on revolution when said first axle rotates ten degrees.

* * * * *